United States Patent Office 2,980,647
Patented Apr. 18, 1961

2,980,647

POLYETHYLENE STABILIZED WITH 3-HYDROXYL 4-(PHENYLCARBONYL) PHENYL ESTERS

Gerald R. Lappin, Kingsport, Tenn., assignor to Eastman Kodak Company, Rochester, N.Y., a corporation of New Jersey No Drawing. Filed Dec. 16, 1957, Ser. No. 702,808

6 Claims. (Cl. 260—45.85)

This invention relates to a new group of compounds that have particular utility for stabilizing organic plastic materials normally subject to photodegradation. A preferred embodiment of the invention concerns stabilized poly-α-olefin compositions, and more particularly, stabilized polyethylene compositions.

Many common organic plastic materials of commerce are subject to photodegradation. Photodegradation of organic plastic materials is evidenced by telltale properties which are imparted to the particular plastic material such as change or acquisition of odor or color, surface cracking, brittleness, loss of dielectric properties, and related properties deleterious to the utility of the organic plastic material. Accordingly, it is common practice to incorporate into organic plastic materials subject to photodegradation various materials to retard or inhibit the formation of such undesirable properties.

It is an object of this invention to provide a new group of compounds suitable for stabilizing organic plastic materials normally subject to photodegradation.

It is another object of this invention to provide a new poly-α-olefin composition of improved stability to ultraviolet light.

It is a further object of this invention to provide a novel deactivator of ultraviolet light that is compatible with normally solid polyethylene compositions.

Other objects of the invention will be apparent from the description and claims which follow.

The novel compounds of the present invention are 3-hydroxy-4-(phenylcarbonyl)phenyl esters which have the following structural formula:

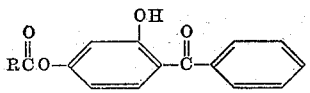

wherein R in an alkyl group containing from 7 to 17 carbon atoms. The substituent, R, can be either straight or branched chain alkyl groups including such groups as n-heptyl, 2-ethylhexyl, n-octyl, 2-methyloctyl, n-nonyl, 2-propyloctyl, n-decyl, n-dodecyl, n-undecyl, n-dodecyl, n-tetradecyl, n-hexadecyl, n-heptadecyl, and the like, as well as various branched chain groups containing 7 to 17 carbon atoms derived from alkyl moieties prepared by the oxo reaction.

The present 3-hydroxy-4-(phenylcarbonyl)phenyl esters can be prepared by heating 2,4-dihydroxybenzophenone with a suitable acid having an alkyl moiety as described in the preceding paragraph at a temperature of about 150–200° C. in the presence of a small amount of an acid esterification catalyst such as p-toluenesulfonic acid, sulfuric acid or phosphoric acid. If desired, the reaction can be effected in a water-entraining solvent such as benzene, toluene, xylene, or a high-boiling naptha, and water formed in the course of the reaction continuously removed with a portion of the solvent. The crude reaction product of 3-hydroxy-4-(phenylcarbonyl)phenyl esters can be "worked-up" or purified by vacuum distillation or recrystallization from such solvents as a hexane-benzene mixture, acetone or the like.

The present higher acyl esters of 2,4-dihydroxybenzophenone have utility as stabilizers for organic plastic materials normally subject to photodegradation such as results on exposure to sunlight or ultraviolet light. Typical of the organic plastic materials that can be stabilized with 3-hydroxy-4-(phenylcarbonyl)phenyl esters include polyvinyl chloride, polystyrene, cellulose acetate, cellulose acetate-butyrate, poly-1,4-cyclohexanedimethylene-terephthalate, polymethyl methacrylate, poly-α-olefins and related organic plastic materials normally subject to photodegradation. The present stabilizers have particular utility as ultraviolet stabilizers for normally solid poly-α-olefins such as polyethylene, polypropylene, poly-4-methylpentene-1, poly-3-methylbutene-1 and other normally solid poly-α-olefins prepared from normally gaseous α-monoolefinic hydrocarbons containing 2 to 10 carbon atoms.

The subject stabilizers are of special interest for the stabilization of normally solid polyethylene compositions against photodegradation as these stabilizers have unexpectedly good compatibility in polyethylene. Many stabilizer materials that are effective stabilizers for other well-known polymers, resins and polyesters are ineffective in polyethylene. For example, 2,4-dihydroxybenzophenone, an effective stabilizer for a wide variety of polymers, resins and polyesters, and from which the stabilizers described herein are prepared, is not an effective stabilizer in polyethylene as it is incompatible therewith. If 2,4-dihydroxybenzophenone is compounded in normally solid polyethylene at even a 0.5% by weight level, for example, exudation of 2,4-dihydroxybenzophenone begins at once, the surface of the polyethylene being covered with a film of crystals of the additive in a very short while. After a few weeks essentially all of the 2,4-dihydroxybenzophenone additive exudes from the polyethylene and the resulting polyethylene has nearly the same degree of instability to photodegradation as unstabilized polyethylene. Thus, it was unexpected when I discovered that the present derivatives of 2,4-dihydroxybenzophenone were compatible with, and effective ultraviolet stabilizers for, polyethylene.

The present 3-hydroxy-4-(phenylcarbonyl)phenyl esters can be employed in a wide range of proportions to stabilize organic plastic materials against photodegradation, the optimum amount used varying with the organic plastic material being stabilized. Amounts of the present stabilizer in excess of 0.01% by weight are usually used in most organic plastic materials, with about 0.1% to 10% by weight being desirably used in poly-α-olefins, and with amounts from about 0.5% to 2.5% by weight being preferably used in polyethylene.

The present stabilizers can be incorporated into organic plastic materials by conventional methods, the method used varying largely with the nature of the organic plastic material being stabilized. The stabilizer can be incorporated into the various plastic substrates by dry blending, deposition from solvent, milling on heated rolls and related conventional methods commonly employed for blending or incorporating stabilizers into organic plastic materials.

The invention is illustrated by the following examples of preferred embodiments thereof.

EXAMPLE 1

Several representative 3-hydroxy-4-(phenylcarbonyl)-phenyl esters of higher fatty acids were prepared by reacting 2,4-dihydroxybenzophenone with the following fatty acids: n-octanoic acid, n-decanoic acid, lauric acid, myristic acid, palmitic acid and stearic acid. In the preparation of the esters, 1.0 mole of 2,4-dihydroxybenzophenone, 1.0 mole of the higher fatty acid and 1.0 g. of p-toluenesulfonic acid were heated in xylene. Sufficient xylene was used to allow the resulting solution to reflux at a reactor temperature of about 150° C. and the water formed was continuously removed by means of a Dean-Stark trap. After 1.0 mole of water had been evolved, the reaction mixture was cooled, diluted with benzene, and washed with aqueous sodium bicarbonate solution. Thereafter, the solvent was removed by distillation under reduced pressure and the resulting crude 3-hydroxy-4-(phenylcarbonyl)phenyl esters of the fatty acids were further purified by vacuum distillation or recrystallization. Although 2,4-dihydroxybenzophenone contains two phenolic hydroxyl groups, only the hydroxyl group in the 4-position is esterified with this procedure. In accordance with this procedure, the following six esters illustrating the present invention were prepared.

(a) *3-hydroxy - 4 - (phenylcarbonyl)phenyl n-octanoate.*—This ester was prepared from a commercial n-octanoic acid, "Neo-Fat 8" sold by Armour and Company, and 2,4-dihydroxybenzophenone. The ester was purified by distillation, B.P. 190–210° C. at 0.2 mm. of mercury. The purified product, obtained in 88% yield, was a yellow liquid which slowly changed to a semicrystalline mush. The calculated carbon and hydrogen content of a product having an empirical formula of $C_{21}H_{24}O_4$ is C=74.1% and H=7.06%. The present product was found to contain C=74.2% and H=7.31%.

(b) *3-hydroxy - 4 - (phenylcarbonyl)phenyl n-decanoate.*—This ester was prepared from a commercial n-decanoic acid, "Neo-Fat 10" sold by Armour and Company, and 2,4-dihydroxybenzophenone. The crude ester was obtained in 95% yield as a light amber oil which slowly changed to a semi-crystalline mush. The calculated carbon and hydrogen content of a product having an empirical formula of $C_{23}H_{28}O_4$ is C=75.0% and H=7.62%. The present product was found to contain C=75.5% and H=7.84%.

(c) *3-hydroxy - 4 - (phenylcarbonyl)phenyl laurate.*—This ester was obtained in 80% yield as a cream-colored solid, M.P. 53–50° C., after recrystallization from a hexane-benzene mixture, by esterifying a commercial lauric acid, about 95% lauric acid, with 2,4-dihydroxybenzophenone. The calculated carbon and hydrogen content of a product having an empirical formula of $C_{25}H_{32}O_4$ is C=75.8% and H=8.08%. The present product was found to contain C=76.0% and H=8.27%.

(d) *3-hydroxy-4-(phenylcarbonyl)phenyl myristate.*—This ester was obtained in 75% yield as a cream-colored solid, M.P. 62–65° C., after recrystallization from a hexane-benzene mixture, by esterifying a commercial myristic acid, about 94% myristic acid, with 2,4-dihydroxybenzophenone. The calculated carbon and hydrogen content of a product having an empirical formula of $C_{27}H_{36}O_4$ is C=76.5% and H=8.50%. The present product was found to contain C=76.6% and H=8.60%.

(e) *3-hydroxy-4-(phenylcarbonyl)phenyl palmitate.*—This ester was obtained in 82% yield as a cream-colored solid, M.P. 53–55° C., after recrystallization from a hexane-benzene mixture, by esterifying a commercial palmitic acid, 92% palmitic acid, with 2,4-dihydroxybenzophenone. The calculated carbon and hydrogen content of a product having an empirical formula of $C_{29}H_{40}O_4$ is C=76.9% and H=8.84%. The present product was found to contain C=77.1% and H=8.92%.

(f) *3-hydroxy - 4 - (phenylcarbonyl)phenyl stearate.*—This ester was obtained in 90% yield as a cream-colored solid, M.P. 63–66° C. after recrystallization from acetone, by esterifying a commercial stearic acid, 90% stearic acid, with 2,4-dihydroxybenzophenone. The calculated carbon and hydrogen content of a product having an empirical formula of $C_{31}H_{44}O_4$ is C=77.5% and H=9.16%. The present product was found to contain C=77.7% and H=9.32%.

EXAMPLE 2

The six 2,4-dihydroxybenzophenone esters of higher fatty acids described in Example 1 above were individually incorporated into polyethylene having a molecular weight of about 30,000 at a concentration of 1% by weight by milling on heated rollers in accordance with usual practice. Thereafter, the polyethylene was compression molded into sheets 60 mils thick. Samples of the resulting sheets containing the various 2,4-dihydroxybenzophenone esters of higher fatty acids were exposed to outdoor weathering on a rack facing south at an angle with the horizontal of 36.5° at Kingsport, Tennessee. Polyethylene samples containing none of the present 2,4-dihydroxybenzophenone esters of higher fatty acids and 1% by weight of 2,4-dihydroxybenzophenone were also included in the weathering test. After 10 weeks of exposure, the individual polyethylene samples containing the six 2,4-dihydroxybenzophenone esters of higher fatty acid esters were found to have no increase in carbonyl content as determined by infrared spectral measurements in the $5.82\mu$ region. However, the sample containing none of the present higher fatty acid ester additive had a substantial carbonyl increase. The surfaces of the exposed samples were also observed and no objectionable amount of exudation was noted on the samples containing the 2,4-dihydroxybenzophenone higher fatty acid esters. However, the exposed sample containing 2,4-dihydroxybenzophenone was observed to contain much exudation of this additive on the surface thereof. The 2,4-dihydroxybenzophenone esters of acetic acid and isobutanoic acid, which were prepared in accordance with the method described in Example 1, were also found to be incompatible with polyethylene and exuded from the polyethylene after being incorporated therein by milling. Thus, the present novel 2,4-dihydroxybenzophenone esters of long chain acids have unexpectedly good compatibility with polyethylene as compared to 2,4-dihydroxybenzophenone and the 2,4-dihydroxybenzophenone esters of short chain acids.

The photodegradation of such organic plastic materials as polyethylene is characterized by the breaking of the polymer chain and the formation of ketonic carbonyl groups. If the degradation or deterioration continues long enough, the mechanical and electrical properties of polyethylene deteriorates seriously. However, before this deterioration of physical properties can be detected by usual tensile strength, brittleness, or elongation measurements, evidence of photodegradation can be obtained by detection of the presence of the resulting carbonyl groups by infrared spectral analysis. Thus, the carbonyl content test, such as was used to determine the effectiveness of the present stabilizers in polyethylene as described in Example 2 above, gives in a short period of ten weeks, for example, information concerning photodegradation which would require one to two years to obtain by using more conventional methods. Reference is made to the following two publications concerning the determination of carbonyl content by infrared measurements: Rugg, Smith and Bacon, J. Polymer Sci., 13, 535 (1954) and Cross, Richards and Willis, Discussions Faraday Soc., No. 9, 235 (1950).

Thus, the present invention provides a new and useful group of compounds, namely 3-hydroxy-4-(phenylcarbonyl)phenyl higher esters. These novel esters are effective as stabilizers for organic plastic materials normally subject to photodegradation, and particularly as stabilizers for polyethylene compositions.

Although the invention has been described in considerable detail with reference to certain preferred embodiments thereof, it will be understood that variations and modifications can be effected within the spirit and scope of the invention as described hereinabove and as defined by the appended claims.

I claim:
1. A solid poly-α-olefin composition comprising solid polyethylene and about 0.01% to 10% by weight based on said polyethylene of a compound having the formula

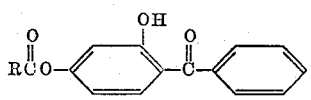

wherein R is an alkyl group containing 7 to 17 carbon atoms.

2. A solid poly-α-olefin composition comprising solid polyethylene and about 0.5% to 2.5% by weight based on said polyethylene of 3-hydroxy-4-(phenylcarbonyl)-phenyl n-octanoate.

3. A solid poly-α-olefin composition comprising solid polyethylene and about 0.5% to 2.5% by weight based on said polyethylene of 3-hydroxy-4-(phenylcarbonyl)-phenyl n-decanoate.

4. A solid poly-α-olefin composition comprising solid polyethylene and about 0.5% to 2.5% by weight based on said polyethylene of 3-hydroxy-4-(phenylcarbonyl)-phenyl laurate.

5. A solid poly-α-olefin composition comprising solid polyethylene and about 0.5% to 2.5% by weight based on said polyethylene of 3-hydroxy-4-(phenylcarbonyl)-phenyl myristate.

6. A solid poly-α-olefin composition comprising solid polyethylene and about 0.5% to 2.5% by weight based on said polyethylene of 3-hydroxy-4-(phenylcarbonyl)-phenyl palmitate.

References Cited in the file of this patent
UNITED STATES PATENTS
2,345,006    Ross _____ Mar. 28, 1944